(No Model.)
F. SCHELP, Jr.
TWO WHEELED VEHICLE.
No. 291,942. Patented Jan. 15, 1884.
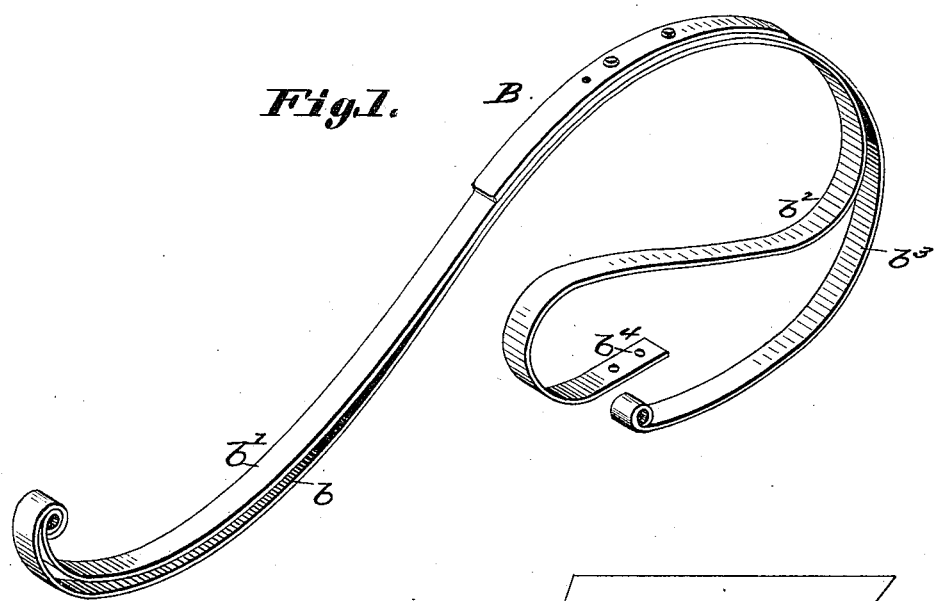
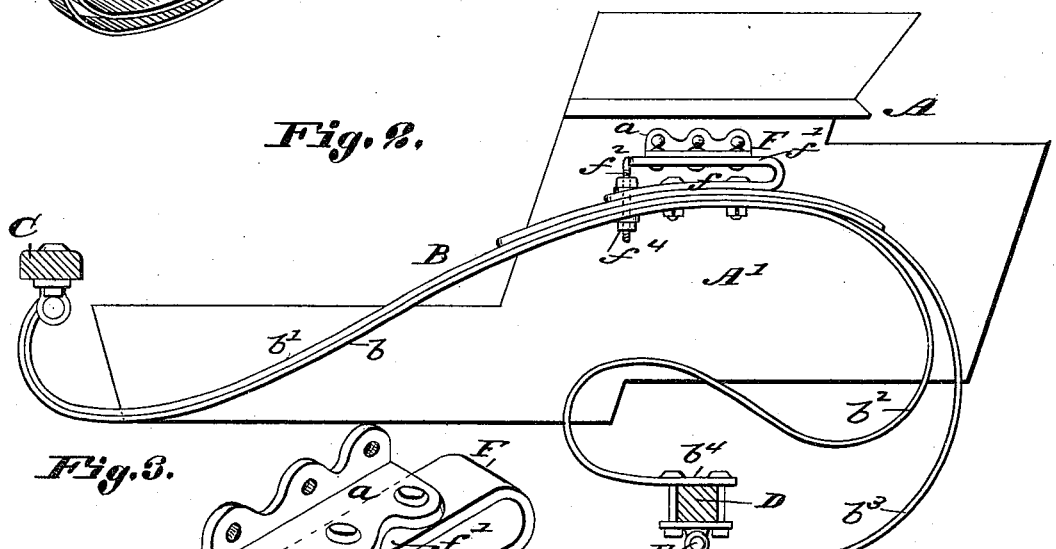
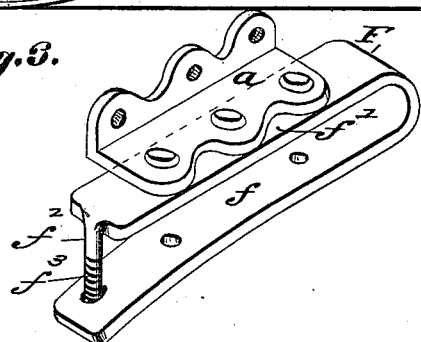
Attest:
Charles Pickles
S. E. Logan.
Inventor:
Fred Schelp Jr.
by C. D. Moody
atty

UNITED STATES PATENT OFFICE.

FRED. SCHELP, JR., OF BALLWIN, MISSOURI.

TWO-WHEELED VEHICLE.

SPECIFICATION forming part of Letters Patent No. 291,942, dated January 15, 1884.

Application filed August 14, 1883. (No model.)

*To all whom it may concern:*

Be it known that I, FRED. SCHELP, Jr., of Ballwin, St. Louis county, Missouri, have made a new and useful Improvement in Two-Wheel Vehicles, of which the following is a full, clear, and exact description, reference being had to the annexed drawings, making part of this specification, in which—

Figure 1 is a view in perspective of one of the springs; Fig. 2, a side elevation, the cross-bar and axle of the vehicle being in section; and Fig. 3, a detail, being a view in perspective upon an enlarged scale.

The same letters of reference denote the same parts.

This improvement has relation to the construction of the springs of the vehicle and the mode of connecting the body with the springs.

A represents a vehicle having the improvement. Only such parts of the vehicle are shown as are essential to an understanding of the improvement.

A' represents the vehicle-body, and B one of the springs. The springs are used in pairs—one at each side of the vehicle-body A'—being connected at their forward ends with the shafts or cross-bar C and at their rear ends with the vehicle-axle D, and the vehicle-body is attached to the springs between the cross-bar and the axle. The spring from the cross-bar or shafts extends backward and upward, and at or near its highest point it is connected with the vehicle-body. It then curves backward and downward and forward to the axle. Between its forward end and its point of connection with the vehicle-body the spring may be in one or more parts, $b$ $b'$. Between its points of connection with vehicle-body and the axle the spring may be in two parts, $b^2$ $b^3$—that is to say, the parts $b$ $b^2$ may be used by themselves and constitute the spring, or, if desired, the parts $b'$ $b^3$ may be used. The parts $b$ $b^2$ are in practice a single spring, and, after passing the vehicle-body to the rear, the part $b^2$ curves backward and downward, and then forward, in a form resembling an S-spring, with its extreme end $b^4$ resting on top of the vehicle-axle, substantially as shown. The essential feature of this part of the spring is that it, $b^2$, shall, after curving downward from the point of connection with the vehicle-body, extend forward above the vehicle-axle, and then return and be connected with the axle. The parts $b'$ $b^3$ are also preferably a single piece, extending from the cross-bar or shafts rearwardly, as described, above the parts $b$ $b^2$, and being connected with the vehicle-body at the same point at which the parts $b$ $b^2$ are connected therewith, and thence extending rearward and curving downward and then forward again, and being connected with the axle D by means of a clip, E. Any suitable means may be employed for connecting the vehicle-body with the spring. I prefer, however, the coupling shown in Figs. 2, 3. This form of coupling enables the vehicle-body to be adjusted at any desirable inclination. It consists of a part, F, in the form of a spring, or a plate of springy material, which, at $f$, is attached to the spring B, and thence, at its rear end, extended upward and then forward at $f'$, where it is connected with the vehicle-body. It is then bent downward at $f^2$, and connected by means of a vertically-adjustable connection, such as the thread $f^3$ and nut $f^4$, by means of which the forward end of the part $f'$ can be raised or lowered, as desired, and the body inclined correspondingly. The part $f'$ might be connected with the part $f$ by means of a hinge; but I prefer the form shown. The coupling also might be reversed—that is, turned the other end forward—or be attached to the under side of the spring instead of to the upper. The coupling is connected with the body by means of a suitable bracket, $a$. The two parts $b$ $b'$ of the spring (when two parts are used) may, between the coupling F and the cross-bar C, be closed together, as in Fig. 2, or separated, as in Fig. 1.

I claim—

1. The spring $b b^2$, said spring, from its point of connection at its forward end with the vehicle, extending backward and upward to above the vehicle-axle, thence curving downward and backward, and terminating at the rear axle and under the seat in the S form, substantially as described.

2. The combination of the part $b$ $b^2$ and the part $b'$ $b^3$, the cross-bar C, the vehicle-body A', and the axle D, the part $b^2$ being bent in S form, and secured to the upper side of said axle, and the part $b^3$ bent and secured under it, all in the manner and substantially as described.

3. The combination of the body A', the spring B, the cross-bar C, and the axle D, said spring being made in two parts, which are separated between the forward end of the spring and the point where it is connected with the vehicle-body, and also separated into two parts in the rear of the point of connection with the vehicle-body, the part $b^2$ of the spring terminating in the S form shown, and the part $b^3$ of the spring being connected with the axle, substantially as shown.

4. The combination of the body A', the spring B, and the coupling F, whereby the vehicle-body can be adjusted at any desired inclination, substantially as described.

FRED. SCHELP, Jr.

Witnesses:
C. D. Moody,
S. E. Logan.